United States Patent Office 3,302,132
Patented Jan. 31, 1967

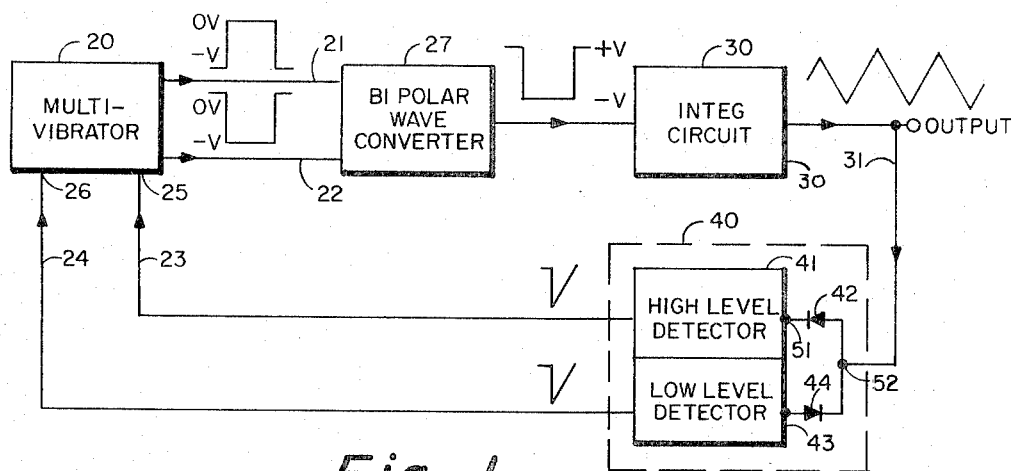
*Fig. 1*
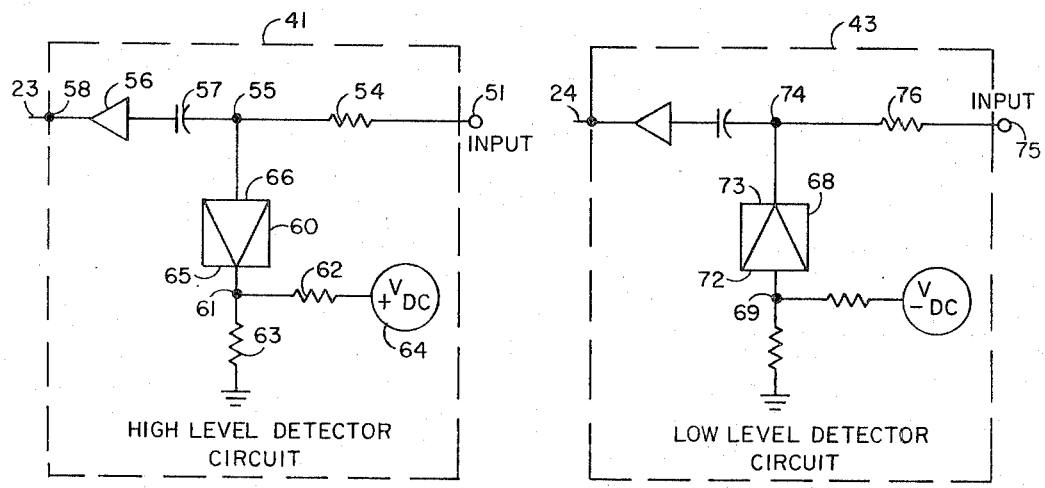
*Fig. 2*      *Fig. 3*
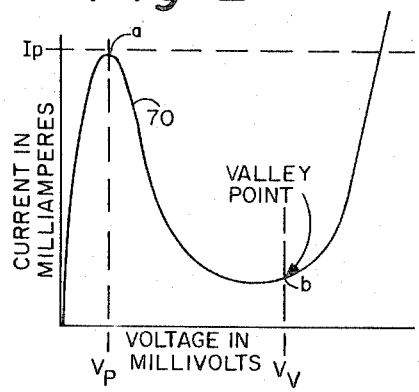
*Fig. 4*
INVENTOR.
JOSEPH KARKLYS
BY
ATTORNEY

3,302,132
BISTABLE MULTIVIBRATOR WITH SELF-TRIGGERING CIRCUIT UTILIZING LEVEL DETECTOR TUNNEL DIODES
Joseph Karklys, Rochester, N.Y., assignor to General Dynamics Corporation, a corporation of Delaware
Filed Oct. 1, 1965, Ser. No. 492,210
6 Claims. (Cl. 331—113)

The present invention relates to test equipment and is particularly directed to a stimulus or signal generator of the type which can, on command, generate a series of sharp pulses or waves which represent continuous functions, such as a sustained square wave, a triangular alternating wave, and a sinusoidal wave, each of a wide range of frequencies and amplitude.

Flight line checkout of electronics of airplanes or rockets is becoming increasingly complex. The number and density of count-down tests is increasing and tolerances are becoming more stringent. Electrical stimuli of all frequencies from zero frequency upward are therefore required for checkout of such equipment.

One of the major problems with electronic test equipment is that ambient temperature changes induce deviations in the test data and render this data questionable. In past attempts to eliminate the problem of temperature variation, the item to be tested and the test equipment have both been included within a temperature regulated chamber. This procedure is practically not feasible for flight line checkout, particularly for airplanes or large rockets. Individual temperature regulated chambers or ovens for containing those electrical components of the test equipment which are temperature sensitive have also been used in the past. However, temperature regulated chambers are, in general, expensive and usually require additional space which may be at a premium within the test equipment.

Accordingly, it is a specific object of the present invention to provide an improved signal or stimulus generator whose output is relatively not affected by changes in ambient temperature.

Another object of the present invention is to provide an improved test equipment which will generate a wide range of frequencies from zero frequency upward.

A still more specific object of the present invention is to provide a generator which is small, light in weight, of low cost, and characterized by the absence of temperature controlled ovens or chambers for maintaining a certain frequency over a relatively wide temperature range.

Another object of the present invention is to provide an improved stimulus generator which produces a substantially constant accurate alternaing current triangular wave output signal and automatically compensates for ambient temperature variations.

The foregoing objects and other objects are accomplished in one embodiment of the invention in a stimulus or signal generator comprising a bistable multivibrator for generating a repetitive square wave having alternating positive-going and negative-going flat topped portions. A linear RC integrating circuit converts the square wave to a triangular alternating wave. A level detector responds to each succeeding positive-going and negative-going voltage ramps of the triangular wave, as it reaches predetermined positive and negative threshold voltages and generates a sharp trigger pulse. This pulse is fed back to the multivibrator to reverse the stable state of the multivibrator. The multivibrator, integrating circuit and detector provide an oscillator having a regenerative loop completed by the feed back path which carries the sharp pulse. The slope of the ramps of the triangular wave is controlled in the RC integrating circuit to control the frequency of alternations in the multivibrator.

According to an important feature of the invention, the level detector includes an upper level detector circuit and a lower level detector circuit for deriving the sharp trigger pulse at a given upper and lower level along the ramp of the triangular wave and in so doing establish the frequency of the triangular wave. Each of the upper and lower level detector circuits includes a tunnel diode and a D.C. voltage source for biasing each of the tunnel diodes at a predetermined high or low voltage level respectively, which voltage level is slightly below the peak-to-peak voltage level of the triangular wave. It has been found that by biasing each of the tunnel diodes in the high level detector circuit and the low level detector circuit in this manner, each of the level detector circuits derives the sharp pulse at a predetermined frequency for reversing the stable state of the multivibrator, which in turn operates at the predetermined frequency independent of the ambient temperature variations.

The invention itself, both as to its organization and method of operation, as well as additional objects and advantages thereof will become more readily apparent from a reading of the following description in connection with the accompanying drawings in which:

FIG. 1 is a block diagram of a stimulus generator in accordance with the invention;

FIGS. 2 and 3 illustrate high and low level detector circuits respectively utilized in the stimulus generator shown in FIG. 1; and FIG. 4 is a graph illustrating a characteristic curve of a tunnel diode utilized in the high level detector circuit and the low level detector circuit shown in FIGS. 2 and 3.

The principal blocks of the stimulus generator 10 of FIG. 1 generate the various voltage wave shapes as shown along the leads interconnecting the principal blocks. The central element of the stimulus generator comprises a bistable multivibrator 20. The output voltages along lines 21 and 22 connected to the multivibrator 20 remain stably at "high" or "low" voltage levels and will change in output voltage level only in response to alternate trigger pulses on lines 23 and 24 connected to input terminals 25 and 26 respectively on the multivibrator 20. The frequency of alternations of voltage from the bistable multivibrator is under the exclusive control of the trigger pulses and, as is well known in the art of bistable multivibrators, the multivibrator can operate at any frequency from zero upward.

The square waves along lines 21 and 22 from the multivibrator 20 are fed into a bipolar wave converter 27. One of the square wave inputs to the bipolar converter may be from negative voltage to ground, as shown along line 21, and the other square wave input, which may be ground to a negative voltage, as shown along line 22. The biploar wave converter 27 converts the two square wave inputs to another square wave which is symmetrically referenced to ground, having the positive voltage level equal to the negative voltage level so as to be bipolar in nature.

The bipolar wave converter 27 may be of the type comprising switching transistors which may be forward biased in response to one of the square wave input signals along lines 21 and 22 to provide a low impedance and may be reverse biased to derive a high impedance to ground for presenting the given negative or positive voltage along a line 28 interconnecting the bipolar converter 27 to an integrating circuit 30.

The bipolar square wave of the bipolar converter 27 is fed into the integrating circuit 30. The intergating circuit 30 may be of the type which comprises a high gain amplifier and condenser-resistor networks not shown. The output of the integrating circuit 30 is now the triangular alternating wave which is applied to a level detector 40 by way of line 31, or it may be taken as an output at terminal 32. As the positive-going ramp of the triangular wave reaches a stable threshold positive voltage, a sharp pulse is created along line 23 and is fed back to the input terminal 25 of the multivibrator 20 to reverse the stable state of the multivibrator 20 and to start the negative-going ramps of the triangular wave. As the negative-going ramp reaches a predetermined negative threshold voltage, a sharp pulse is created along line 24 and is fed back to the other input terminal 26 of the multivibrator 20 to again reverse its stable state and to initiate the succeeding positive-going ramps of the triangular wave 30.

The level detector 40 includes a high level detector circuit 41, connected to line 23, and a diode 42 connected between the high level detector circuit 41 at an input terminal 51 and a junction 52 on line 31. The level detector 40 also includes a low level detector circuit 43 and a diode 44 connected between the high level detector circuit 43 and junction 55. The cathode of the diode 42 is connected to the input terminal 51 of the high level detector circuit 41, while the anode is connected to junction 52 so that the diode 42 is back biased for the negative portion of the triangular wave and conducting during the positive portion of the triangular wave.

The high level detector circuit 41 includes a current-limiting resistor 54 connected between input terminal 51 and a junction 55. An amplifier 56 and a D.C. blocking capacitor 57 are connected between junction 55 and an output terminal 58 of the high level detector circuit 41. In accordance with a feature of the invention, the high level detector circuti 41 includes a tunnel diode 60, connected between junctions 55, 61 and a voltage divider network having resistors 62 and 63 connected between a source 64 of D.C. positive voltage ($+V_{DC}$) and ground. The cathode 65 of the tunnel diode 60 is connected to the junction 61, while the anode 66 of the tunnel diode 60 is connected to the junction 55. The voltage divider network comprising the resistors 62 and 63 establish a bias voltage at the cathode 65 of the tunnel diode 60, such that the voltage at the junction point 61 is slightly below the positive peak voltage level of the triangular wave, for example, the triangular wave may have a positive peak voltage level of 12 volts, while the voltage at junction 61 may be at a positive 11 volts.

As will be pointed out in more detail, the biasing of the tunnel diode 60 at junction 61 overcomes the problems previously mentioned which are caused by ambient temperature variation. An understanding of the operating characteristics of the tunnel diode would be helpful in the teaching of this invention.

FIG. 4 shows the operating characteristics of the tunnel diode. The tunnel diode 60 has a characteristic curve as shown at 70 in FIG. 4. As may be seen from the characteristic curve, a tunnel diode presents a rather low forward resistance until the current therethrough exceeds a threshold point, known as the peak point, and indicated as $a$ on curve 70. When the peak point is reached by the application of a peak current $I_p$, any further increase in voltage across the tunnel diode will cause a rapid increase in the resistance of the tunnel diode and its operating point will suddenly shift from point $a$ through its unstable state to a stable operating point, such as $b$ which may be referred to as the valley point. The difference in the voltages from $V_p$ to $V_v$ is the peak amplitude of the trigger pulse. For additional and more detailed information concerning tunnel diodes and their characteristics, reference may be made to General Electric's Tunnel Diode Manual, 1961 edition.

It has been found that in the absence of the biasing voltage at junction 61, unwanted variations in the frequency of the trigger pulse results, together with unwanted changes in the frequency of the triangular wave. Ambient temperature variation causes the peak point $a$ of the tunnel diode to shift along the current axis, so that more or less current than peak current is required, depending on ambient temperature, to shift to the stable point $b$. It has been found that the threshold point or peak point varies appreciably with ambient temperature; it may be, for example, as high as five percent of the peak current $I_p$.

The biasing voltage at junction 61 compensates for the high percentage change in peak current $I_p$, by operating within a very narrow voltage differential or potential, say in the order of 1 volt instead of 12 volts. It is thus believed that a five percent change of a small voltage change results in a much smaller deviation-error than a five percent change of a larger potential.

The current-limiting resistor 54 has an ohmic value which, when a voltage of a predetermined voltage appears thereacross, develops the peak current $I_p$. The predetermined voltage which appears across the resistor 54 is established by the difference between a level of the triangular wave and the biasing voltage on junction 61. This compensation may be considered in the light that a given percentage change of a large potential differential across the tunnel diode 60 results in a greater value than if the same percentage change of a smaller potential differential and thus, even though the temperature variation may induce the same percentage change in the operating characteristics of the tunnel diode 60, the bias voltage at junction 61 reduces the potential differential between the input signal at terminal 51 and junction 61.

The level detector circuit 43 is similar to the high level detector circuit 41, except that a tunnel diode 68 is reversed and the bias potential at a junction 69 is at a negative potential instead of a positive potential or voltage. The low level detector circuit 43 has a tunnel diode 68 which has an anode 72 connected to the junction 69 and a cathode 73 connected to a junction 74 which is connected to an input terminal 75 through a current limiting resistor 76. The low level detector circuit 43 operates in the same manner as the high level detector circuit 41, except that a negative input signal having a negative peak current $I_p$ turns the tunnel diode 68 on to derive a sharp trigger pulse along line 24.

In the operation of the stimulus generator 10, the bistable multivibrator 20 generates a rectangular pulse along line 21 and a similar rectangular pulse of different phase along the line 22. The two rectangular pulses are then applied to the bipolar converter 27 which, in response to square pulses, generates another square pulse having a positive voltage reference and a negative voltage swing which goes through zero or ground potential. The square pulse from the bipolar converter 27 is fed into the integrating circuit 30 where it is integrated into a triangular wave output. The triangular wave output may be taken off the output terminal 32 and also fed into the level detector 40 by way of line 31. The oppositely poled diodes 42 and 43 rectify the input to the high level detector circuit 41 and the low level detector circuit 43. The high level detector circuit 41 includes the resistor 54 which determines the peak current $I_p$ which may be applied to the tunnel diode 60. The peak current $I_p$ is derived when the triangular wave reaches a given voltage level along each ramp of the triangular wave. The high level detector circuit 41 generates a sharp trigger pulse in response to the peak current $I_p$. The tunnel diode 60 in the high level detector circuit 41 is back biased by the biasing potential at junction 61, so that the tunnel diode 60 does not conduct until a given voltage on the triangular wave exceeds the bias potential on junction 61 and thereafter the tunnel diode is turned on because the peak current $I_p$ exists at junction 55. In a similar manner, the low level detector circuit 43 derives a sharp trigger pulse in response to the negative excursion of the triangular wave, and a sharp trigger pulse is also applied to input terminal 26 by way of line 24. The multivibrator 20 is thus triggered into operation as previously described.

What is claimed is:

1. A stimulus generator comprising
   (a) a multivibrator responsive to trigger pulses for producing a square wave synchronous with said trigger pulses which are applied thereto,
   (b) integrating means coupled to said multivibrator for generating a triangular wave in synchronism with said square wave,
   (c) high level detector means including a tunnel diode coupled to said integrating means for generating said trigger pulses in response to a predetermined positive level of said triangular wave,
   (d) low level detector means including a tunnel diode coupled to said integrating means for generating another one of said trigger pulses in response to a predetermined negative level of said triangular wave, and
   (e) means for applying said trigger pulses to said multivibrator to control the frequency of said square wave.

2. A stimulus generator comprising
   (a) a multivibrator responsive to trigger pulses for producing a square wave synchronous with said trigger pulses which are applied thereto,
   (b) integrating means coupled to said multivibrator for generating a triangular wave in synchronism with said square wave,
   (c) high level detector means including a biased tunnel diode coupled to said integrating means for generating said trigger pulses in response to a predetermined positive level of said triangular wave,
   (d) first means for biasing said tunnel diode at a positive level slightly below said predetermined positive level,
   (e) low level detector means including a biased tunnel diode coupled to said integrating circuit for generating another one of said trigger pulses in response to a predetermined negative level of said triangular wave,
   (f) second means for biasing said tunnel diode at a negative level slightly below said predetermined negative level, and
   (g) means for applying said trigger pulses to said multivibrator to control the frequency of reversal of said square wave.

3. An alternating current generator comprising
   (a) a bistable device for generating square waves,
   (b) integrating means for generating positive-going and negative-going voltage ramps in response, respectively, to ascending and descending portions of said square wave,
   (c) a first threshold means including a tunnel diode for comparing the positive-going ramp voltage with a positive threshold voltage and generating a first trigger pulse in response to a first predetermined ramp voltage,
   (d) a second threshold means including a tunnel diode for comparing the negative-going ramp voltage with a negative threshold voltage and generating a second trigger pulse in response to a second predetermined ramp voltage, and
   (e) means for applying said first and second trigger pulses to said bistable device to respectively reverse the stable state of said device.

4. An alternating current generator comprising
   (a) a bistable device for generating square waves,
   (b) integrating means for generating positive-going and negative-going voltage ramps in response, respectively, to ascending and descending portions of said square wave,
   (c) a first threshold means including a positively biased tunnel diode for comparing the positive-going ramp voltage with a positive threshold voltage and generating a first trigger pulse in response to a first predetermined ramp voltage,
   (d) a second threshold means including a negatively biased tunnel diode for comparing the negative-going ramp voltage with a negative threshold voltage and generating a second trigger pulse in response to a second predetermined ramp voltage, and
   (e) means for applying said first and second trigger pulses to said bistable device to respectively reverse the stable state of said device.

5. An alternating current generator comprising
   (a) a bistable device for generating square waves,
   (b) integrating means for generating positive-going and negative-going voltage ramps in response, respectively, to positive and negative portions of said square wave,
   (c) a first threshold means including a tunnel diode for comparing the positive-going ramp voltage with a positive threshold voltage and generating a first trigger pulse in response to a first predetermined ramp voltage,
   (d) a second threshold means including a tunnel diode for comparing the negative-going ramp voltage with a negative threshold voltage and generating a second trigger pulse in response to a second predetermined ramp voltage, and
   (e) means for applying said first and second trigger pulses to said bistable device to respectively reverse the stable state of said device.

6. An alternating current generator comprising
   (a) a bistable device for generating square waves,
   (b) integrating means for generating positive-going and negative-going voltage ramps in response, respectively, to positive and negative portions of said square wave,
   (c) a first threshold means including a positively biased tunnel diode for comparing the positive-going ramp voltage with a positive threshold voltage and generating a first trigger pulse in response to a first predetermined ramp voltage,
   (d) a second threshold means including a negatively biased tunnel diode for comparing the negative-going ramp voltage with a negative threshold voltage and generating a second trigger pulse in response to a second predetermined ramp voltage, and
   (e) means for applying said first and second trigger pulses to said bistable device to respectively reverse the stable state of said device.

References Cited by the Examiner

UNITED STATES PATENTS 2,879,412  3/1959  Hoge et al. _____ 331—113

ROY LAKE, *Primary Examiner.*

J. KOMINSKI, *Assistant Examiner.*